United States Patent
Thomsen et al.

(10) Patent No.: US 10,452,613 B2
(45) Date of Patent: Oct. 22, 2019

(54) PERSISTENT DIRECTORY FOR VARIABLE-SIZE ENTRY CONTAINER FREE-SPACE HANDLING

(71) Applicant: SAP SE, Walldorf (DE)

(72) Inventors: Dirk Thomsen, Heidelberg (DE); Thorsten Glebe, Leimen (DE)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 15/654,179

(22) Filed: Jul. 19, 2017

(65) Prior Publication Data

US 2019/0026302 A1    Jan. 24, 2019

(51) Int. Cl.
| | |
|---|---|
| *G06F 12/00* | (2006.01) |
| *G06F 16/17* | (2019.01) |
| *G06F 3/06* | (2006.01) |
| *G06F 12/12* | (2016.01) |

(52) U.S. Cl.
CPC ........ *G06F 16/1727* (2019.01); *G06F 3/0608* (2013.01); *G06F 3/0631* (2013.01); *G06F 12/12* (2013.01)

(58) Field of Classification Search
CPC ............. G06F 17/30138; G06F 3/0608; G06F 3/0631; G06F 12/12
See application file for complete search history.

(56) References Cited

U.S. PATENT DOCUMENTS

| | | | | |
|---|---|---|---|---|
| 5,721,915 A * | 2/1998 | Sockut | ................ | G06F 16/2282 |
| 6,675,278 B1 * | 1/2004 | Chowdhary | ........ | G06F 12/0238 |
| | | | | 711/103 |
| 9,934,163 B1 * | 4/2018 | Armangau | .......... | G06F 12/0804 |
| 2007/0288719 A1 * | 12/2007 | Cholleti | ................ | G06F 12/023 |
| | | | | 711/170 |
| 2010/0223305 A1 * | 9/2010 | Park | .................. | G06F 16/24547 |
| | | | | 707/814 |

(Continued)

OTHER PUBLICATIONS

Lossy Data Compression, Oct. 7, 2014, Stanford University, https://web.archive.org/web/20141007095139/https://cs.stanford.edu/people/eroberts/courses/soco/projects/data-connpression/lossy/index.htnn (Year: 2014).*

(Continued)

*Primary Examiner* — Prasith Thammavong
(74) *Attorney, Agent, or Firm* — Sterne, Kesslerm Goldstein & Fox P.L.L.C.

(57) ABSTRACT

Disclosed herein are embodiments for free-space handling in pages and in-memory containers allowing variable-size data entries. An example system may determine expanses of unallocated space, within a page loaded in memory and configured to allocate a first data entry of a first size within the page that may also allocate at least one subsequent data entry of a second size different from the first size; save, into memory, transient free-space information corresponding to the page, including first position information for a first number of expanses of contiguous unallocated space within the page; evict the page from memory, writing allocated data entries contained therein to persistent storage; store, into persistent storage, persistent free-space information corresponding to the page, including second position information for a second number of expanses of unallocated space within the page, the second number being less than the first number; and discard the transient free-space information.

20 Claims, 9 Drawing Sheets

(56) References Cited

U.S. PATENT DOCUMENTS

| | | | |
|---|---|---|---|
| 2010/0287346 A1* | 11/2010 | Schreter | G06F 12/023 711/162 |
| 2011/0289263 A1* | 11/2011 | McWilliams | G06F 12/0284 711/103 |
| 2012/0030406 A1* | 2/2012 | Chang | G06F 9/5016 711/6 |
| 2012/0060012 A1* | 3/2012 | Olszewski | G06F 12/1009 711/171 |
| 2012/0323971 A1* | 12/2012 | Pasupuleti | G06F 17/30306 707/802 |
| 2015/0161012 A1* | 6/2015 | Meier | G06F 11/1458 707/649 |
| 2015/0186442 A1* | 7/2015 | Wildermuth | G06F 16/2228 707/696 |
| 2016/0283391 A1* | 9/2016 | Nilsson | G06F 12/0893 |
| 2016/0314138 A1* | 10/2016 | Fang | G06F 17/30371 |
| 2017/0160981 A1* | 6/2017 | B | G06F 3/0644 |
| 2017/0371912 A1* | 12/2017 | Kimura | G06F 17/30351 |

OTHER PUBLICATIONS

To BLOB or Not to BLOB: Large Object Storage in a Database or a Filesystem?, Apr. 2006, Microsoft Corporation, https://www.microsoft.com/en-us/research/wp-content/uploads/2006/04/tr-2006-45.pdf (Year: 2006).*

U.S. Appl. No. 15/600,633, filed May 19, 2017.

* cited by examiner

| Data Entry 210A |
|---|
| Data Entry 210B |
| Data Entry 210C |
| Data Entry 210D |
| Data Entry 210E |
| Data Entry 210F |

| Data Entry 210A |
| Data Entry 210B |
| Data Entry 210C |
| Data Entry 210D |
| Data Entry 210E |
| Data Entry 210F |
| Data Entry 210G |
| Data Entry 210H |
| Data Entry 210I |
| Data Entry 210J |
| Data Entry 210K |
| Data Entry 210L |

FIG. 2B

| Data Entry 210A |
|---|
| Data Entry 210B |
| Data Entry 210C |
| ~~Data Entry 210D~~ |
| Data Entry 210E |
| Data Entry 210F |
| Data Entry 210G |
| Data Entry 210H |
| Data Entry 210I |
| Data Entry 210J |
| Data Entry 210K |
| Data Entry 210L |

| Data Entry 210A |
|---|
| Data Entry 210B |
| Data Entry 210C |
| ~~Data Entry 210D~~ |
| Data Entry 210E |
| Data Entry 210F |
| Data Entry 210G |
| Data Entry 210H |
| Data Entry 210I |
| Data Entry 210J |
| Data Entry 210K |
| Data Entry 210L |
| Data Entry 210M |

Data Entry 210A

Data Entry 210B

Data Entry 210C

~~Data Entry 210D~~

Data Entry 210E

Data Entry 210F

Data Entry 210G

Data Entry 210H

Data Entry 210I

~~Data Entry 210J~~

Data Entry 210K

Data Entry 210L

Data Entry 210M

FIG. 2E

Data Entry 210A

Data Entry 210B

Data Entry 210C

~~Data Entry 210D~~

Data Entry 210E

Data Entry 210F

Data Entry 210G

Data Entry 210H

Data Entry 210I

Data Entry 210N

~~Data Entry 210J~~

Data Entry 210K

Data Entry 210L

Data Entry 210M

PERSISTENT DIRECTORY FOR VARIABLE-SIZE ENTRY CONTAINER FREE-SPACE HANDLING

BACKGROUND

In the design and implementation of in-memory databases, data may be loaded into memory using pages, such that each page can be handled as a unit. Given limited space in memory, when data in a page is no longer needed, the page may be committed to persistent or longer-term storage and evicted from memory. With implementations of pages or data entries each having a fixed size, any page or allocated space for data entries may be freed or otherwise evicted, and any other page may be loaded in place of the previous page. However, when using entries of variable sizes, once a an entry is evicted or otherwise de-allocated, the next entry to be added into memory may not fit into the same space of the evicted entry, thereby necessitating use of a larger set of contiguous free space in memory.

The larger set of contiguous space may lack the same spatial and temporal locality as the freed space from the evicted page or entry, potentially making the database slower and more difficult to manage, with more overhead in accessing and processing the data entries. Also, the handling of free space becomes less efficient, further depleting sets of contiguous space while other small gaps remain scattered throughout. Conventional techniques for managing or working around these gaps also add significant overhead, while not employing any such techniques will still inevitably lead to other performance problems, from suboptimal speed to excess memory usage to failures in accessing or processing data.

BRIEF DESCRIPTION OF THE DRAWINGS

The accompanying drawings are incorporated herein and form a part of the specification.

FIGS. 2A-2F depict example memory usage over time within at least one page of a variable-size entry container in memory, according to some embodiments.

in the drawings, like reference numbers generally indicate identical or similar elements. Additionally, generally, the left-most digit(s) of a reference number identifies the drawing in which the reference number first appears.

DETAILED DESCRIPTION

Figure 1:
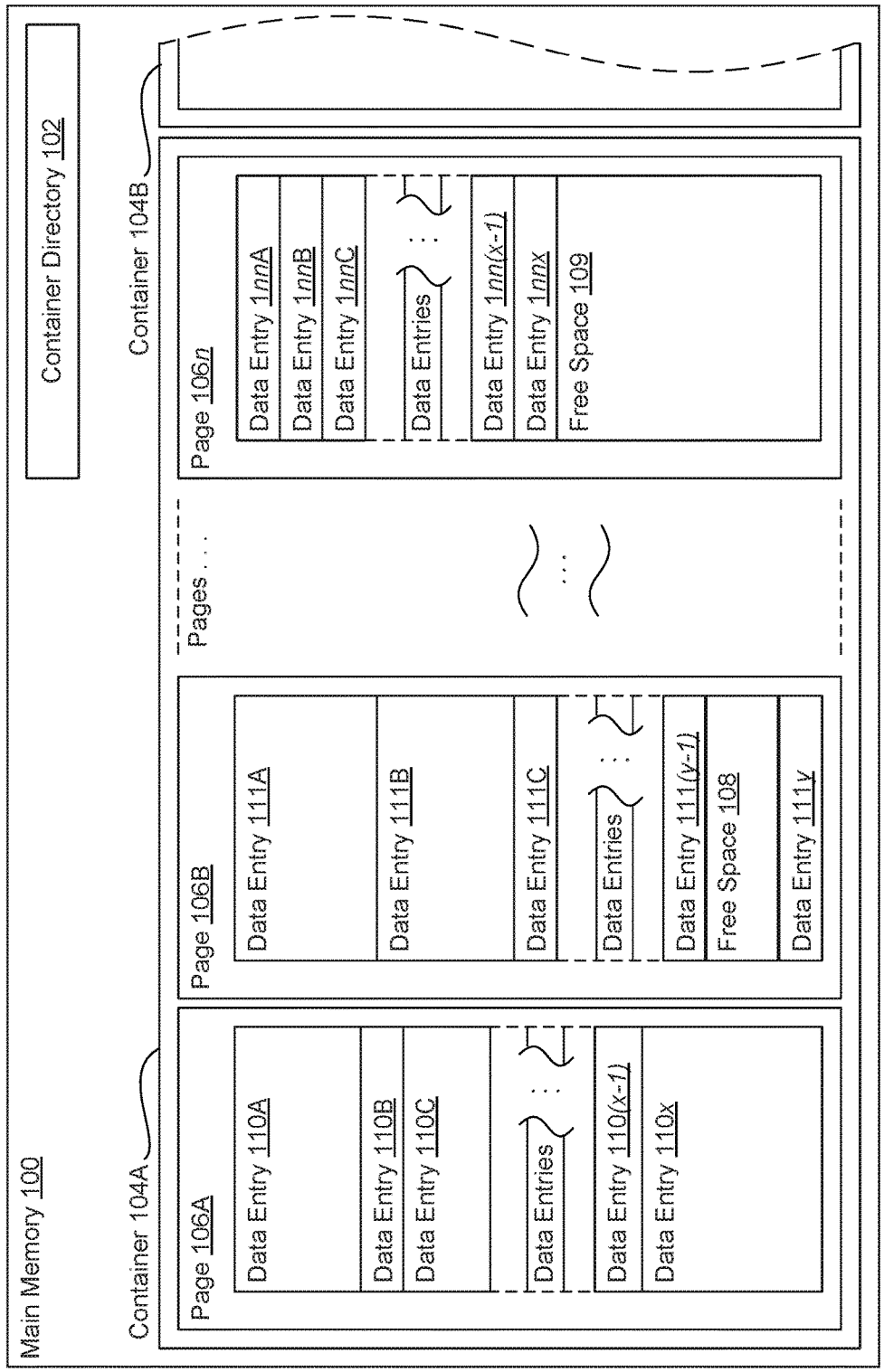
FIG. 1 shows an example block diagram of relevant structures in memory, according to some embodiments.

Provided herein are system, method and/or computer program product embodiments, and/or combinations and sub-combinations thereof, for handling free space in variable-size paging for in-memory database containers.

Inefficiencies surrounding page management in in-memory databases, such as those described herein, may be addressed using different novel approaches to how pages are loaded and stored, for example, within containers. For example, free space may be consolidated within a container when the container is written to persistent or longer-term storage, in some embodiments.

Thus, evicting and reloading the same container may be used to group pages within the container and improve or even maximize contiguous free space, with a performance trade-off for the added paging and consolidation operations. Additionally, such a workaround to consolidate free space may hamper concurrency and disallow parallel access to the relevant container. This type, and other types, of transient free-space handling may be complex, especially with the need to avoid race conditions while maintaining high speeds and low access times. For example, performance of similar operations with classical locking techniques may become relatively slow.

In other embodiments, it may be further possible to reuse space from within existing pages, such as from deleted entries within a loaded page, or page space never yet used within a loaded page, for example. Such implementations may therefore save or store information about free space that may be used within pages.

Implementations that do not save or store such information (part of automated free-space handling) would require a new search for contiguous free space every time a new data entry is created. There may be reasons not to save or store such information, such as when usable memory space for data in particular is at a premium, for example. However, it may often be useful to traverse a page or each page only as necessary to ascertain and generate a list of free locations in which to store data, as well as size of contiguous expanses of unallocated space.

A system implementing containers in this way may handle free space for allocating additional data entries to be stored in the container by choosing one or more of these options regarding pages in a container: creating and adding a new page, using deleted entry space in an existing page, and/or using previously unused space in an existing page. In other embodiments, additional options may be possible.

In some embodiments, at least one of the above options may be used, potentially in combination with at least one other of the above options, or other options. For example, depending on which option would result in the least overhead, fastest operation, least memory allocation, most contiguous free space available, etc., the system may dynamically decide which option to use for each allocation of a new entry under given circumstances.

For example, if a system uses a pattern for allocation, e.g., space allocated first is deleted first, etc., then it may not always be useful to search for free space within pages, and this type of system would default to adding a new page unless other constraints were present, such as a container size limit or a memory allocation limit. Adding new pages in memory this way may save overhead by saving memory that would otherwise be used for free-space information and saving CPU cycles for tracking and/or computing locations of contiguous free space, but may come with a trade-off of leaving some memory space unused in partially used pages, for example.

In some other embodiments, some systems may have variable entry sizes but may limit available entry sizes to only a certain number of possibilities, and may thus handle this limited selection of entry sizes similarly to containers having only one fixed entry size. For other containers with a wide range of possible entry sizes, increased flexibility becomes desirable for improved performance.

Data entries may be, for example, data commonly found in SQL database tables, including large object (LOB) data types, in a database management system (DBMS) that allows for use of these additional ranges of contiguous space to load or add new data within partially-used pages within a container, fewer pages need to be allocated, reducing creation of new pages, al location of memory for in-memory database systems, and overall performance improvements, in some example embodiments. If an existing expanse of contiguous space is insufficient, new page(s) may need to be allocated, incurring overhead.

As a practical matter, even if an in-memory database stores information about contiguous free space for every transient page or transient data entry, information stored about free space within pages may be too large to store for every page in every container in such a way that would also get saved to persistent or longer-term storage any time a container is evicted. Instead, substantial performance gains may still be realized, in some embodiments, by tracking transient pages or entries at the time they are loaded in memory, and only storing information about a certain number of pages, such as those pages containing a certain number of the largest amounts, or proportions, of contiguous free space when the container is evicted, for example.

In other words, memory space permitting, relevant tracking information about pages, data entries, and free space may be kept in memory, but instead of discarding it upon de-allocation or destruction of a container or page, for example, this tracking information may be committed to longer-term persistent storage upon de-allocation or destruction of a container and/or page. In some embodiments, it need not all be stored, but rather only the most relevant portions of the tracking data, such as the n largest runs of contiguous free space, may be committed to longer-term storage, thus conserving persistent storage space and avoiding overly large backups.

Such performance gains may then be realized when the container and/or page is again loaded into memory, such as after a startup, reboot, takeover, reload, or other page-in of the container, because the system would then already have access to information about free space in pages, not having to search and then populate transient page or transient data-entry information every time the container is loaded into memory for an in-memory database, in some examples.

Describing the structure of memory used in an embodiment, memory may be allocated in pages of a fixed or variable size, up to which a container may be defined. In some embodiments, page sizes may be chosen from a limited set of possible page sizes. In other embodiments, page sizes may be arbitrary. Within a given container, an arbitrary number of pages may be created or loaded. Within each page, an arbitrary number of data entries may be added or deleted, for example. As the smallest data unit, a data entry may have as a minimum size the smallest unit of data recognized by the DBMS. In some exemplary embodiments, a data entry may be as small as one bit, one byte, one word, etc., but these examples are in no way limiting.

Variable-size data entries need not have variable-size pages; in some embodiments, common implementations may fix sizes of pages, only allowing variable sizes of data entries within the pages. Thus, the concepts disclosed with variable-size entry containers may apply in a variety of implementations, with fixed- or variable-size pages, realizing similar benefits regardless of whether or not page sizes are fixed or variable. Containers themselves need not be of any fixed size.

In some alternative embodiments, to provide another example, page sizes within containers and data entry sizes within pages may be limited to multiples of a certain factor. Such limitations may facilitate efficient use of free space. Similarly, in other embodiments, pages may force data entries within pages to be of a certain size multiple, for example. Such limitations on variable sizes of pages and data entries may make the behavior of some variable-size entry containers more like fixed-size entry containers, potentially reducing system overhead.

Use of containers in this manner may facilitate memory allocation depending on data types, such that different kinds of containers may be used for storing corresponding different types of data. Depending on the type of data, containers may have different initialization parameters, such as container size, number and size of pages, number and size of data entries, whether pages and/or their data entries may be of variable size, initial values for certain data entries, etc.

When a container is created and/or loaded, characteristic information about the container may be stored in a container directory, which may, in some embodiments, be initially backed by persistent storage, in other embodiments, the container directory may be initially only in memory, but may be later committed to longer-term persistent storage at a time when the corresponding container or any page information would be de-allocated, destroyed, or otherwise evicted from memory to longer-term persistent storage.

Characteristic information about the container may include parameters such as the initialization parameters enumerated above, and may have any other amount or type of information, such as data type, other hard limits on number or size of pages or data entries, which may be specified for all containers in a system, or per container, following policies or manual user input, to name a few examples.

Another useful piece of information to be stored in the container directory may further include information about free space within the container, including page space for new pages, as well as free space for data entries within existing pages. As described above, the container directory in persistent storage may not always contain information about expanses of free space within a container, but may instead be pared down to only a certain number of the largest expanses, such that persistent storage space may be conserved.

Determinations of how much of such information should be preserved in longer-term persistent storage may be made by a system administrator or developer in accordance with actual system constraints, such as availability of memory, persistent storage, and amounts of network bandwidth and transfer limits for remote backups, etc., to name a few non-limiting examples.

In order to describe usage of free space within a page, in some example embodiments, one may start by observing use of a new page. For example, when a new page is created (allocated), the page is empty, such that all space within the page is free. Any entries may be added to the page sequentially from one end of the page (initial address counting up or final address counting down, for example), until the page is full of entries.

However, filling free space in the page may become irregular when an entry is deleted, leaving a hole or gap in the used addresses of a page, for example. A new entry may not necessarily fit into the gap left by a deleted entry. It is not necessary to consider a completely full page in the context of managing contiguous free space; for example, in a particular container, there may be, for purely illustrative exemplary purposes, four pages of the following sizes: 1 MiB, 4 MiB, 1 MiB, and 16 MiB. In total, these four pages occupy 22 MiB in this example, thereby composing a 22-MiB container. Thus, the size of a given container may be the sum of the sizes of its component pages. In this example embodiment, although the container is 22 MiB in size, some of the pages forming the container may not be completely filled with data entries, resulting in the net size of the data contained being less than the overall size of the container.

If, for example, a 2-MiB data entry were deleted from the second page, then there would be 2 MiB of free space in the middle of the partially used page space, along with any other unallocated free space in any of the other pages in the container. Without tracking the size of free space, a system could not blindly attempt to create another data entry of, e.g., 1.5 MiB, into the same space as freed by the 2-MiB data entry (in this non-limiting example, the size of each new page may be limited to one of 1 MiB, 4 MiB, or 16 MiB, for example); such a system would have to allocate space from a heap or pool of unallocated free space and add another page at least as large, in this case 4 MiB, growing the container to a larger size. However, in a system that does track free space within containers, and assuming that an amount of contiguous free space in this example would be from the freed 2-MiB entry, this existing second page could safely hold another data entry of up to 2 MiB in size without creating or allocating any other new pages in the container.

Tracking free space in this way may have its own pain points and sources of overhead, however, especially when containers and/or pages are evicted from main memory. If the free-space tracking information is not stored persistently, then it is lost and takes time and computing power to regenerate when the containers and/or pages are again loaded into memory. On the other hand, storing all of this information in persistent storage may also be costly in terms of storage space consumed as well as processing to store and reload such information as needed. Still, overhead and performance of such operations may be considerably improved by embodiments disclosed herein.

FIG. 1 shows an example block diagram of relevant structures in memory, according to some embodiments.

Here, in this purely illustrative example, in order to reduce complexity of the diagram, main memory 100 as depicted focuses on a first container 104A, which may be the only container in memory in some embodiments, or which may be one of any number of containers, in other embodiments. Here, a similar container 104B is partially shown, and there may be additional containers (not shown). Each container may have any number of pages, such as page 106A, page 106B, and so on through page 106n. In an actual implementation, main memory 100 may contain an arbitrary number of containers, and each of which may contain an arbitrary number of pages.

Each page may contain an arbitrary number of data entries, which may vary from each page to the next. Page 106A-n may contain zero or one to x data entries 110A-110x, where x may be an arbitrary number that may fit within the size of the corresponding page; the same applies to page 106B and 111A-111y, where y may be different from x. In practice, the actual quantities of containers, pages, and data entries may be practically unlimited in some embodiments, or instead subject to any limitation imposed by the capacity of the database or computer system itself, or in some other embodiments, arbitrarily by a user or system configuration. Pages may also contain expanses of free space, such as free space 108 or free space 109, for example. Free space 109 may extend to the end of a page as a result of having never been allocated, whereas free space 108, sandwiched between two data entries (100(x−1) and 100x) may have been the result of another data entry having been deleted in its place.

For pages having fixed entry sizes, a page header may include, for example, positions (offsets) of data entries in the page. A page header may store information valid for the entire page to which it corresponds. Thus, for fixed-size entry pages, the fixed entry size is stored in the page header. In some embodiments of pages having variable-size entries, the entry size is stored in an entry header (not shown). Aside from any page header (not shown) or entry header, any remaining space in the page may be made available for data entries, in certain embodiments.

As also shown, main memory may contain a container directory 102, in which may be stored information about the location and size of expanses of free or unallocated data across all containers and pages in a given environment, such as free space 108, free space 109, and similar expanses, in some embodiments. In other embodiments, container directory 102 may be modular and/or tied to specific containers or groups of containers.

While loaded in main memory 100, in some embodiments, container directory 102 may ascertain, record, and/or track information regarding to expanses of free or unallocated space within a given container. However, in some embodiments, before being committed to disk or longer-term storage, a user or implementer may wish to save less of this data to more permanent storage, in order to conserve storage space and/or processor cycles on a computer or system. For example, the system may be configured to store only the n largest expanses, where n may be an arbitrary number less than the total number of expanses of free space presently logged in container directory 102, in some embodiments.

FIGS. 2A-2F depict example memory usage over time within at least one page of a variable-size entry container in memory, according to some embodiments.

As a general overview of the approach taken in this example, these drawings focus only on data entries in the context of one container, in this illustrative embodiment. In practice, such data entries may be present within any number of pages greater than or equal to the number of data entries. A page may contain multiple data entries, although any given data entry must fit within a single page. These drawings of FIGS. 2A-2F may be viewed as a graphical representation of contents of container directory 102 as shown in FIG. 1. Such contents would closely track or mirror the state of the actual memory footprint of a container.

Solving problems of new technology using conventional methods can introduce new pain points if the conventional methods cannot easily scale to new constraints and other unique aspects of the new technology. As mentioned herein, space may be allocated for new data entries as long as new pages can be added to the container, but to the extent that free space within the container is to be managed with variable-size entries, conventional methods dictate that the system traverse every page of a container resident in memory to determine a location and size of each extent of free space.

Such brute-force traversal comes with its own trade-offs, such as slow access times (high latency) and additional processing (low efficiency), potentially with each step of creating or loading elements in memory. Such traversals, which would not necessarily use permanent store or other means for separate free-space handling, would save on total memory and storage space used, but likely would not achieve a desirable outcome in the quickest or most efficient manner, in some embodiments.

FIGS. 2A-2F, in this non-limiting example embodiment, demonstrate a time-lapse portrayal of a problem and solution for memory allocation of a new data entry. Although there are multiple ways in which the problem could arise and multiple ways to solve the problem, the use of a persistent container directory, in some situations and embodiments, may be a substantial improvement over other known methods of solving this problem, in terms of both overall time and overall efficiency of processing.

FIG. 2A shows a beginning state, in which data entries 210A-210E have allocated space in memory, without any gaps between them. Another detail of importance is that the data entries shown in FIG. 2A are not of uniform size. Rather, these data entries are part of a variable-size entry container. In this exemplary embodiment, at the time of FIG. 2A, it is assumed that there is considerable free space remaining in the container that ultimately contains these entries. Thus, a new page could be allocated to contain new data entries, or any new data entries could be inserted into unused or freed space in existing pages from other data entries that have been deleted, destroyed, de-allocated, and/or otherwise evicted from memory.

FIG. 2B shows an example of new data entries being added. Again, following the immediately preceding description of FIG. 2A, the new data entries 210F-210L (highlighted) have been added in relatively contiguous fashion, without creating any gaps or holes between them and other data entries in memory, in this exemplary embodiment.

FIG. 2C shows an example of a data entry being evicted. Cross-hatching on data entry 210D indicates that the actual data in memory would have been deleted, or allowed to be overwritten, following eviction from memory to longer-term storage. However, in this embodiment, the positions in memory of the other data entries remain the same. In some alternate embodiments, it may be possible in various ways to reorganize the existing allocated memory objects to be contiguous and thereby also maximize contiguous free or unallocated space; however, that would require significant processing overhead and time. Here, the variable-size entry container, using transient free-space information in memory, may perform steps to attempt efficient reuse of de-allocated space from within pages that have de-allocated but not defragmented the memory footprints of the variable-size entry container.

FIG. 2D, for example, shows a new data entry 210M being added. In this case, the variable-size entry container would have considered the space vacated by data entry 210D. However, it turns out that data entry 210M is too large for this space, so it is added at the end of allocated space, either in a new page, unallocated space at the end of an existing page, or a larger expanse of freed space from a previous data entry.

As the total number of pages may be arbitrary, at least depending on actual sizes, it is not necessary to assume generally that data entries 210A-210M would be in any way limiting or descriptive of a maximum capacity of their corresponding variable-size entry container. However, for purposes of this illustrative example embodiment, it may be assumed that there is no more free space in the container. If there is no more free space in the container, and another data entry is sought to be added, then it may become necessary to employ any of the more inefficient techniques discussed above to try reconsolidating free space. This could involve any of a number of possible shuffling, reorganizing, and/or defragmenting operations, any of which may further require evicting multiple pages or an entire container from memory to longer-term storage, then reloading the relevant data structures (container and pages contained) back into memory.

A more efficient solution would be to find a gap in existing space, such as from a de-allocated, destroyed, destructed, deleted, or otherwise evicted data entry, into which a new data entry would fit. It follows that a suitable gap would be of equal or greater size compared with the new data entry to be added. Subsequently, the new data entry may be inserted in the place of the old data entry, thus eliminating the need for any more expensive operations, and only relying on the management of free-space information to make a quick decision of where to insert the new data entry. Even if the container memory space was not at or near maximum capacity (e.g., a mostly empty container), it would still be efficient to find such a gap to fill with a new entry, because it may still likely shrink backups of the container, whether resident in memory or in longer-term persistent storage. Efficient usage in this manner may result in improved savings of bandwidth and transfer of data over a network, for example.

FIGS. 2E and 2F show a clearer example of this concept. In FIG. 2E, data entry 210J is now evicted from memory. In FIG. 2F, a new data entry 210N is sought to be written. In this case, data entry 210N is still larger than evicted data entry 210D, but is smaller than evicted data entry 210J. Accordingly, data entry 210N is inserted at an edge boundary of where data entry 210J had been. Because data entry 210N is smaller than data entry 210J was, there is still some empty space (gap or hole) remaining between data entry 210N and data entry 210K.

Thus, the benefits of free-space tracking may be apparent from FIGS. 2A-2F, but these benefits may be lost when transient free-space information becomes lost. This may happen through eviction and/or invalidation of the container in memory, or de-allocation, deletion, or destruction of the transient free-space information, such as by de-allocation, deletion, or destruction of the container or relevant pages, for example, or also from reboot or takeover.

One solution to this additional problem is to write this transient free-space information to persistent longer-term storage. However, this also involves trade-offs, such as of the size of data (including more free-space information) to be written to the storage, as well as time to write such data. An improved solution, in this embodiment, is therefore to track only the largest several (one or more) expanses of free space, ignoring the smaller ones, if there are any, as actual performance gains from preserving free-space data of smaller expanses of unallocated space would tend to become significantly less noticeable after the first n free-space entries, where n may be calibrated for specific system metrics, in an exemplary embodiment.

Figure 3:
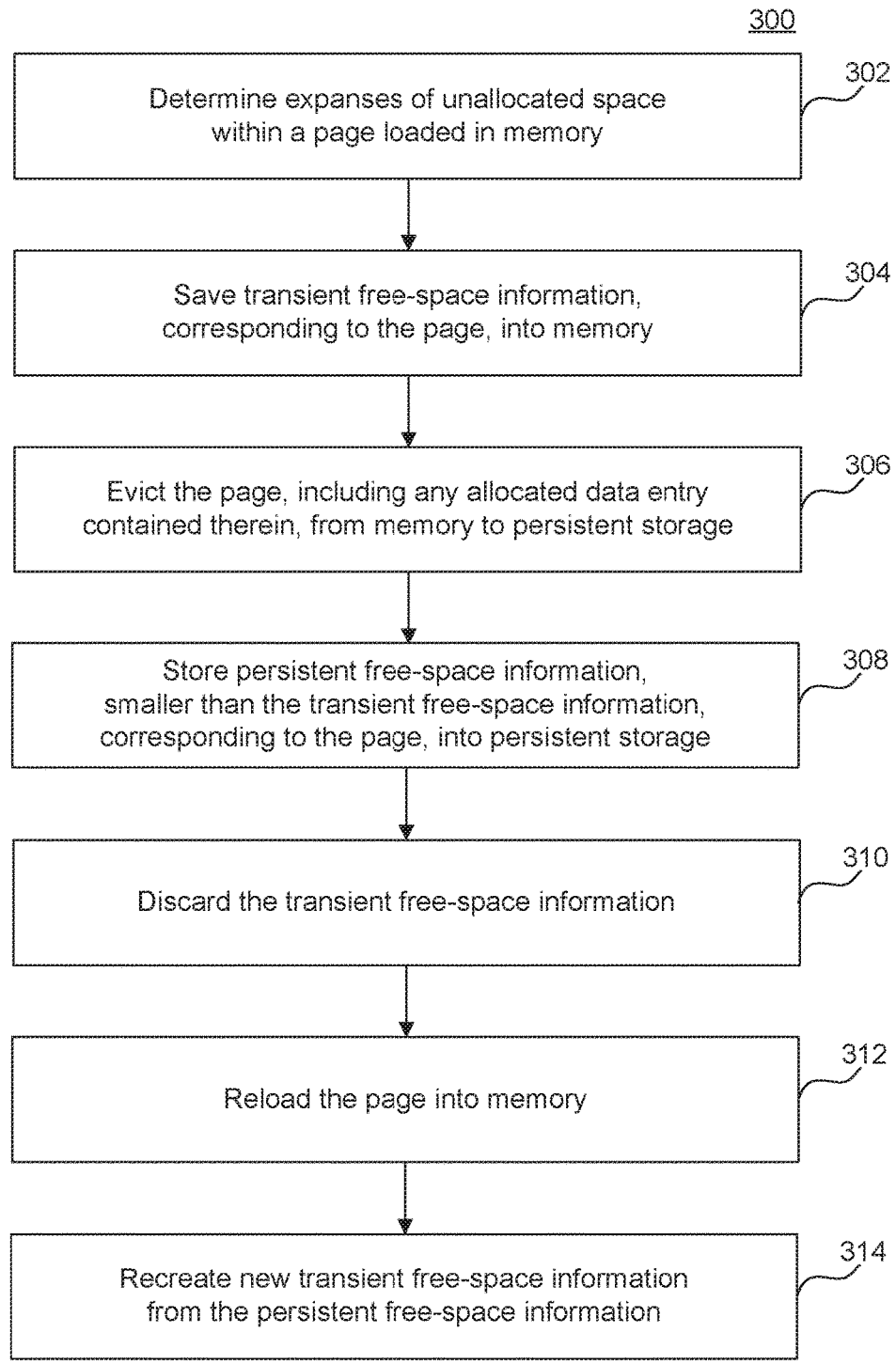
FIG. 3 shows a flowchart illustrating a method of tracking free space in an in-memory database, according to some embodiments.

An example of such an improved solution is illustrated in FIG. 3. In particular, FIG. 3 is a flowchart depicting one execution path, in an example embodiment, among other possible execution paths not explicitly shown.

Figure 4:
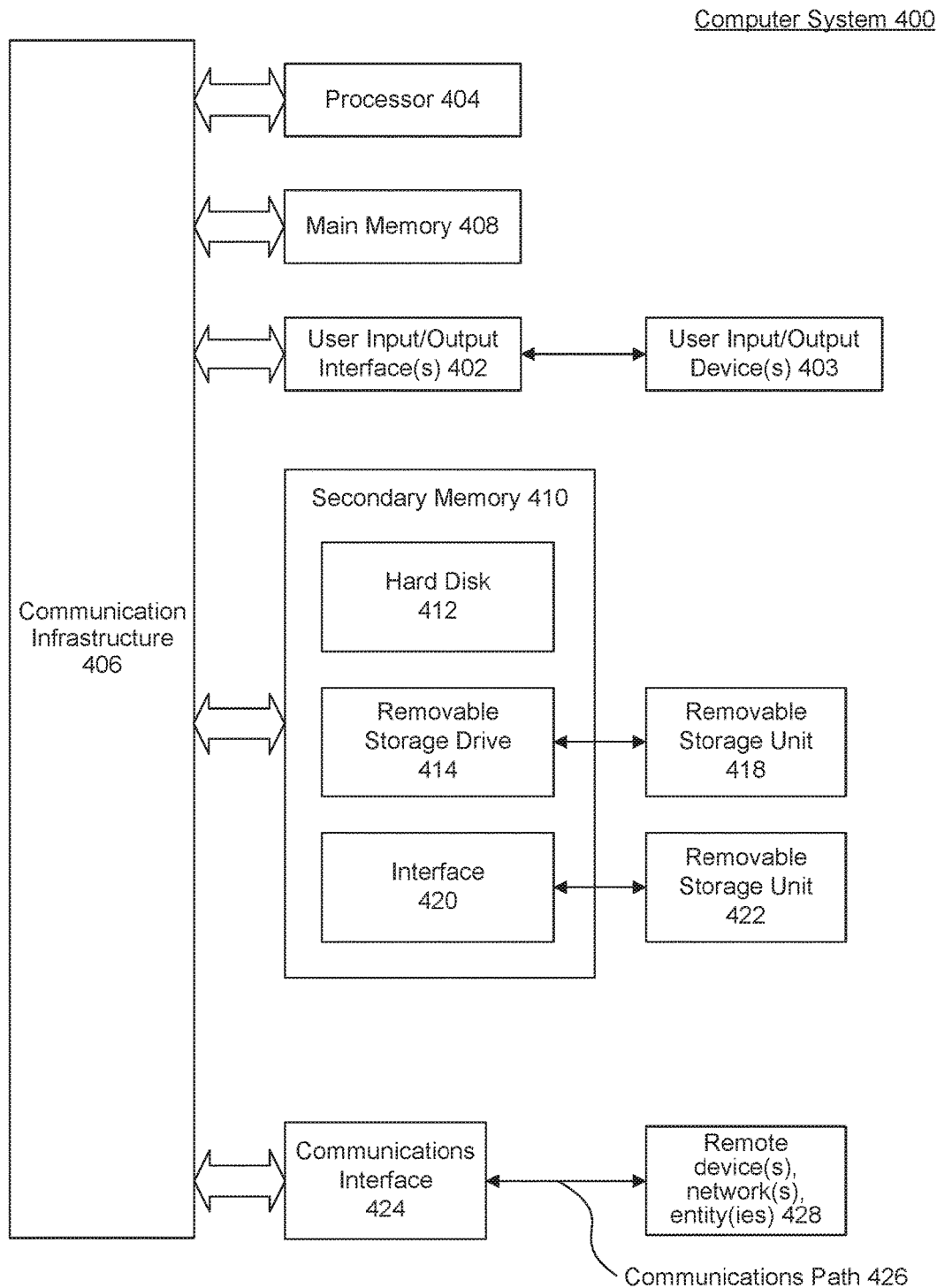
FIG. 4 is an example computer system useful for implementing various embodiments.

FIG. 3 shows process 300, illustrated by a flowchart illustrating a process for tracking free space in an in-memory database, such as one that may be implemented in or executed on any computer systems such as that shown in FIG. 4. However, process 300 is not limited to that example embodiment. This process 300 may be used by or for any of the embodiments described herein that would have any in-memory database.

Process 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order from that shown in FIG. 3, as will be understood by a person of ordinary skill in the art.

In 302, processor 404 may determine expanses of unallocated space within a page loaded in memory. For example, in some embodiments, this may further involve a plurality of expanses of unallocated space, within a page that is loaded in memory and configured to allocate a first data entry of a first size within the page, and further configured to allow allocation of at least one subsequent data entry of at least one second size different from the first size. By way of an example with a visual representation, FIGS. 2A-2F show data entries 210A and 210B each being of a different size, such that the size of data entry 210A may be a first size, and the size of data entry 210B may be a second size, in the example of this embodiment.

In 304, processor 404 may save transient free-space information, corresponding to the page, into memory. For example, this transient free-space information may include, among other things, first position information for a first number of expanses of contiguous unallocated space within the page, first size information for each expanse of the first number of expanses of contiguous unallocated space within the page, etc., and/or other relevant attributes of expanses of free space in transient paged memory, in some non-limiting embodiments.

In 306, processor 404 may evict the page, including any allocated data entry contained therein, from memory to longer-term, persistent storage. As may be expected for page-out or similar eviction or de-allocation operations, any transient free-space information would no longer be useful for a page that is no longer in memory, as the designated memory space for such transient free-space information may be limited and needed instead for tracking free space of pages and entries that are currently in memory. As part of the eviction process, the corresponding data entry may be invalidated and only wait in place, ready to be overwritten by a subsequent data entry, in some embodiments. In other embodiments, for example, where security may be more of a concern, memory may be deleted, zeroed out, randomly overwritten and/or otherwise securely wiped upon eviction of a page and/or any data entry, in some non-limiting examples.

In 308, processor 404 may store persistent free-space information, in an amount smaller than that of the transient free-space information, corresponding to the page, into persistent storage. In some embodiments, the persistent free-space information may include second position information for a second number of expanses of unallocated space within the page, and the second number may be less than the first number. In other words, in some embodiments, the free-space information stored into longer-term, persistent storage may be a subset of the total free-space information stored in memory for transient pages. This may, for example, be done to save space in storage, save overhead from writing all of the information from memory into storage, etc., in some example embodiments.

In this example, the transient free-space information may be taken from parts of container directory 102 corresponding to evicted containers and/or pages having variable-size data entries. Also in this example, the persistent free-space information actually saved to longer-term storage may be less than the full amount of transient free-space information, such as, in some embodiments, only the n largest expanses of free space within a given page or container.

In 310, processor 404 may discard the transient free-space information. As may be expected for page-out or similar eviction or de-allocation operations, any transient free-space information would no longer be useful for a page that is no longer in memory, as the designated memory space for such transient free-space information may be limited and needed instead for tracking free space of pages and entries that are currently in memory. As part of the eviction process, the corresponding data entry may be invalidated and only wait in place, ready to be overwritten by a subsequent data entry, in some embodiments. In other embodiments, for example, where security may be more of a concern, memory may be deleted, zeroed out, randomly overwritten and/or otherwise securely wiped upon eviction of a page and/or any data entry. The same may be done for discarded transient free-space information, in some embodiments, as this may further guard against length-disclosure attacks on evicted data entries, for example.

In 312, processor 404 may reload the page into memory. The reload may be in response to system demand, or otherwise accessing the page in the course of operation that would be calling it, in some exemplary embodiments. In other cases, the reload may be due to a system start, reboot, migration, user switch, takeover, or other similar event, for example.

In 314, processor 404 may recreate new transient free-space information from the persistent free-space information. Following 312, on a system without persistent free-space information, the reloaded page would need to be traversed to generate new transient free-space information upon reload. However, in an exemplary embodiment, after persistent free-space information had been stored into longer-term, persistent storage at 308, a system may conserve considerable time and overhead by recreating free-space information from the persistent free-space information, already stored in persistent storage, as new transient free-space information in memory. In some embodiments, this recreating may involve directly copying the persistent free-space information to memory as transient free-space information, if the information may be formatted in the same manner. In other implementations, there may be a reconstituting process in which the format of the persistent free-space information is transformed or converted into a different format for transient free-space information.

Process 300 is disclosed in the order shown above in this exemplary embodiment of FIG. 3. In practice, however, the operations disclosed above, alongside other operations, may be executed sequentially in any order, or they may alternatively be executed concurrently, with more than one operation being performed simultaneously, or any combination of the above.

Various embodiments may be implemented, for example, using one or more well-known computer systems, such as computer system 400 shown in FIG. 4. Computer system 400 may be used, for example, to implement process 300 of FIG. 3.

Computer system 400 includes one or more processors (also called central processing units, or CPUs), such as a processor 404. Processor 404 is connected to a bus or communication infrastructure 406.

Computer system 400 also includes user input/output device(s) 403, such as monitors, keyboards, pointing devices, etc., which communicate with communication infrastructure 406 through user input/output interface(s) 402.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes a primary or main memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 4114 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communications path 426.

A computer system may also be any one of a personal digital assistant (PDA), desktop workstation, laptop or notebook computer, netbook, tablet, smart phone, smart watch, or embedded system, to name a few non-limiting examples.

Any such computer system 400 may run any type of application associated with a layered repository facility, including legacy applications, new applications, etc.

Computer system 400 may be a client or server, accessing or hosting any applications through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (faaS), backend as a service (BaaS), mobile backend as a service (MBaaS), or infrastructure as a service (IaaS); or a hybrid model including any combination of the foregoing examples or other comparable services or delivery paradigms.

Additionally, configuration information and changes thereto may be generated by users, machines, or programs, using any number of interfaces such as APIs, protocols, or user tools, including text editors, web-based configuration front-ends, graphical configurators, voice input, environment sensors, etc.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

The data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the configuration provider for layered repository using data processing devices, computer systems and/or computer architectures other than that shown in FIG. 4. In particular, embodiments may operate with software, hardware, and/or operating system implementations other than those described herein.

By way of another example, the computer system 400 may include, but is not limited to, a mobile phone or other mobile device, a personal digital assistant (PDA), a computer, a cluster of computers, a set-top box, a smart watch, a smart phone, a tablet, VR/AR headset or helmet, or other types of device capable of processing instructions and receiving and transmitting data to and from humans and other computing devices.

In such embodiments, alternative means for moving and manipulating data objects, such as gestures, commands, vocal instructions or voice commands, to name a few non-limiting examples. Some interfaces may work on the same display or across multiple displays.

In some embodiments, the computer system 400 may include a user interface controller for processing output provided by applications, such as web browsers. These outputs may be a virtual representation of a web browser window, for example. Alternatively, computer system 400 may be connected to a display such as the output of an interactive terminal screen, which may be viewed on devices such as CRT, plasma, LCD, or OLED monitors or touch screens, in some exemplary embodiments. However, a "display" generally may be any kind of output device, including a printer, speaker, screen reader, signaling device, serial port, or any other output device.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for tracking free space in an in-memory database, comprising:
    determining, by at least one processor, a plurality of expanses of unallocated space, within a page, wherein the page is loaded in memory and configured to allocate a first data entry of a first size within the page, wherein the page is further configured to allow allocation of at least one subsequent data entry of at least one second size different from the first size;
    saving, by the at least one processor, into memory, transient free-space information corresponding to the page, comprising first position information for a first number of expanses of contiguous unallocated space within the page;
    evicting, by the at least one processor, the page from memory, wherein the page and any allocated data entry contained therein is to be written to persistent storage;
    storing, by the at least one processor, into persistent storage, persistent free-space information corresponding to the page, comprising second position information for a second number of expanses of unallocated space within the page, wherein the second number is less than the first number; and
    discarding, by the at least one processor, the transient free-space information.

2. The method of claim 1, wherein the page is contained in an in-memory container, and wherein information corresponding to the page, is stored in a container directory.

3. The method of claim 2, wherein the in-memory container contains a plurality of pages, and wherein the container directory is configured to store information corresponding to the plurality of pages.

4. The method of claim 1, wherein the second number is less than or equal to n, wherein n is a number less than the first number, and wherein the second position information stored into persistent storage corresponds to the n largest expanses of contiguous unallocated space within the page.

5. The method of claim 1, further comprising:
    reloading, by the at least one processor, the page into memory; and
    recreating new transient free-space information from the persistent free-space information, by the at least one processor.

6. The method of claim 1, further comprising:
    determining, by the at least one processor, via the transient free-space information, a given set of one or more contiguous expanses of unallocated space within the page,
        wherein the given set is located between a first allocated space, corresponding to the first data entry, within the page and a second allocated space, corresponding to a second data entry, within the page,
        wherein the given set corresponds to a third data entry within the page, wherein the third data entry has been evicted from the page, and
        wherein no defragmenting operation has been performed within the page since the third data entry has been evicted from the page; and
    allocating, by the at least one processor, a fourth data entry to the given set.

7. A database management system, comprising:
    a memory; and
    at least one processor coupled to the memory and configured to:
        determine a plurality of expanses of unallocated space, within a page, wherein the page is loaded in the memory and configured to allocate a first data entry of a first size within the page, wherein the page is further configured to allow allocation of at least one subsequent data entry of at least one second size different from the first size;

save, into the memory, transient free-space information corresponding to the page, comprising first position information for a first number of expanses of contiguous unallocated space within the page;

evict the page from the memory, wherein the page and any allocated data entry contained therein is to be written to persistent storage;

store, into persistent storage, persistent free-space information corresponding to the page, comprising second position information for a second number of expanses of unallocated space within the page, wherein the second number is less than the first number; and discard the transient free-space information.

8. The system of claim 7, wherein the page is contained in an in-memory container, and wherein information corresponding to the page, is stored in a container directory.

9. The system of claim 8, wherein the in-memory container contains a plurality of pages, and wherein the container directory is configured to store information corresponding to the plurality of pages.

10. The system of claim 7, wherein the second number is less than or equal to n, wherein n is a number less than the first number, and wherein the second position information stored into persistent storage corresponds to the n largest expanses of contiguous unallocated space within the page.

11. The system of claim 7, the processor further configured to:

reload the page into the memory; and recreate new transient free-space information from the persistent free-space information.

12. The system of claim 7, wherein at least one of the first data entry and the at least one subsequent data entry comprises data of a large object (LOB) data type.

13. The system of claim 7, further configured to:

determine, via the transient free-space information, a given set of one or more contiguous expanses of unallocated space within the page, wherein the given set is located between a first allocated space, corresponding to the first data entry, within the page and a second allocated space, corresponding to a second data entry, within the page, wherein the given set corresponds to a third data entry within the page, wherein the third data entry has been evicted from the page, and wherein no defragmenting operation has been performed within the page since the third data entry has been evicted from the page; and allocate a fourth data entry to the given set.

14. A non-transitory computer-readable device having instructions stored thereon that, when executed by at least one computing device, causes the at least one computing device to perform operations comprising:

determining, in an in-memory database, a plurality of expanses of unallocated space, within a page, wherein the page is loaded in memory, wherein the page is configured to allocate a first data entry of a first size within the page, and wherein the page is configured to allow allocation of at least one subsequent data entry of at least one second size different from the first size;

saving, into memory, transient free-space information corresponding to the page, comprising first position information for a first number of expanses of contiguous unallocated space within the page;

evicting the page from memory, wherein the page and any allocated data entry contained therein is to be written to persistent storage.

15. The non-transitory computer-readable device of claim 14, wherein the page is contained in an in-memory container, and wherein information corresponding to the page, is stored in a container directory.

16. The non-transitory computer-readable device of claim 15, wherein the in-memory container contains a plurality of pages, and wherein the container directory is configured to store information corresponding to the plurality of pages.

17. The non-transitory computer-readable device of claim 14, the operations further comprising:

storing, into persistent storage, persistent free-space information corresponding to the page, comprising second position information for a second number of expanses of unallocated space within the page, wherein the second number is less than or equal to n, wherein n is a number less than the first number, and wherein the second position information stored into persistent storage corresponds to the in largest expanses of contiguous unallocated space within the page.

18. The non-transitory computer-readable device of claim 14, further comprising:

reloading the page into memory; and recreating new transient free-space information from persistent free-space information retrieved from persistent storage and corresponding to the page being reloaded into memory.

19. The non-transitory computer-readable device of claim 14, wherein at least one of the first data entry and the at least one subsequent data entry comprises data of a large object (LOB) data type.

20. The non-transitory computer-readable device of claim 14, the operations further comprising:

determining, via the transient free-space information, a given set of one or more contiguous expanses of unallocated space within the page, wherein the given set is located between a first allocated space, corresponding to the first data entry, within the page and a second allocated space, corresponding to a second data entry, within the page, wherein the given set corresponds to a third data entry within the page, wherein the third data entry has been evicted from the page, and wherein no defragmenting operation has been performed within the page since the third data entry has been evicted from the page; and allocating a fourth data entry to the given set.

* * * * *